US012061282B2

(12) United States Patent
Doaré et al.

(10) Patent No.: US 12,061,282 B2
(45) Date of Patent: Aug. 13, 2024

(54) METHOD, DEVICE, AND RADAR SYSTEM

(71) Applicant: NXP USA, INC., Austin, TX (US)

(72) Inventors: Olivier Vincent Doaré, La Salvetat St Gilles (FR); Birama Goumballa, Larra (FR)

(73) Assignee: NXP USA, Inc., Austin, TX (US)

( * ) Notice: Subject to any disclaimer, the term of this patent is extended or adjusted under 35 U.S.C. 154(b) by 277 days.

(21) Appl. No.: 17/451,828

(22) Filed: Oct. 22, 2021

(65) Prior Publication Data

US 2022/0196791 A1  Jun. 23, 2022

(30) Foreign Application Priority Data

Dec. 22, 2020 (EP) ..................................... 20290089
Jun. 28, 2021 (EP) ..................................... 21290043

(51) Int. Cl.
*G01S 7/02* (2006.01)
(52) U.S. Cl.
CPC .................................. *G01S 7/0233* (2021.05)
(58) Field of Classification Search
CPC ....................................................... G01S 7/0233
See application file for complete search history.

(56) References Cited

U.S. PATENT DOCUMENTS

| | | | |
|---|---|---|---|
| 6,574,286 B2 | 6/2003 | McVey | |
| 8,885,692 B2 | 11/2014 | Ly-Gagnon | |
| 9,819,412 B1 * | 11/2017 | Shankar | ........... H04B 10/50575 |
| 9,923,269 B1 | 3/2018 | Hageman et al. | |
| 2003/0128660 A1 | 7/2003 | Ito et al. | |
| 2003/0185327 A1 | 10/2003 | Chen | |
| 2004/0032913 A1 | 2/2004 | Dinur | |
| 2004/0196925 A1 | 10/2004 | Moore et al. | |
| 2005/0156662 A1 | 7/2005 | Raghupathy et al. | |

(Continued)

FOREIGN PATENT DOCUMENTS

WO    WO-2004107697 A1 * 12/2004    ............... H03C 3/40

OTHER PUBLICATIONS

Kalyoncu, I., "A Phase-Calibration Method for Vector-Sum Phase Shifters Using Self-Generated Lut", IEEE Transactions on Circuits and Systems I: Regular Papers, vol. 66, No. 4, Apr. 1, 2019.

(Continued)

*Primary Examiner* — Vladimir Magloire
*Assistant Examiner* — Maxine McKenzie Phillips

(57) ABSTRACT

A method, device and a radar system for determining phase error caused by impairments in a phase rotator comprises (a) forcing the Q path of the phase rotator to zero and obtaining a first sequence of successive measurement values, (b) forcing the I path of the phase rotator to zero and obtaining a second sequence of successive measurement, (c) forming a sequence of successive measurement value pairs, each measurement value pair comprising one measurement value from the first sequence of successive measurement values and one measurement value from the second sequence of successive measurement values (d) calculating an actual phase value for each of the successive measurement value pairs, and (e) determining the phase error by comparing the actual phase values with the corresponding reference phase values.

17 Claims, 3 Drawing Sheets

(56) References Cited

U.S. PATENT DOCUMENTS

| | | | |
|---|---|---|---|
| 2005/0187752 A1* | 8/2005 | Colby | H02M 7/53806 |
| | | | 703/19 |
| 2007/0025433 A1 | 2/2007 | Hammerschmidt et al. | |
| 2007/0058702 A1 | 3/2007 | Zhang | |
| 2008/0077015 A1* | 3/2008 | Boric-Lubecke | G01S 13/888 |
| | | | 600/453 |
| 2008/0192877 A1 | 8/2008 | Eliezer et al. | |
| 2009/0237295 A1* | 9/2009 | Jaklitsch | G01R 35/005 |
| | | | 342/174 |
| 2010/0041353 A1 | 2/2010 | Alford et al. | |
| 2014/0192923 A1 | 10/2014 | Matsuo et al. | |
| 2017/0288762 A1 | 5/2017 | Miyanaga et al. | |
| 2020/0158821 A1 | 5/2020 | Doare et al. | |
| 2020/0400783 A1 | 12/2020 | Doare et al. | |

OTHER PUBLICATIONS

Notice of Allowance for U.S. Appl. No. 16/904,200 mailed Apr. 3, 2023, 9 pages.

Notice of Allowance for U.S. Appl. No. 17/361,590, mailed Aug. 23, 2022, 7 pages.

Non-Final Office Action for U.S. Appl. No. 16/904,200 mailed Sep. 20, 2022, 25 pages.

U.S. Appl. No. 17/361,590, filed Jun. 29, 2021, entitled "Phase Rotator Calibration Apparatus and Method Therefor".

Non-Final Office Action for U.S. Appl. No. 17/361,590, mailed Apr. 4, 2022, 20 pages.

* cited by examiner

METHOD, DEVICE, AND RADAR SYSTEM

TECHNICAL FIELD

The present disclosure relates to the field of radar detection. More specifically, the present disclosure relates to methods and devices for determining phase error caused by impairments in a phase rotator, said impairments including leakage in mixers and/or multipliers of the phase rotator, gain/amplitude imbalance and phase imbalance between an I path and a Q path in the phase rotator. Furthermore, the present disclosure relates to a radar system capable of determining phase error caused by impairments in a phase rotator, said impairments including leakage in mixers and/or multipliers of the phase rotator, gain/amplitude imbalance and a phase imbalance between an I path and a Q path in the phase rotator.

ART BACKGROUND

Beam steering is intensively used in FMCW radar detection to improve the overall radar performance. Beam steering involves controlling the direction of the antenna arrays to reinforce the main lobe of a radar radiation pattern. This is done by controlling the phase and the amplitude of the array antennas of the radar solution. Phase and amplitude of the radiation pattern may e.g. be digitally controlled through a phase rotator. Any distortions from the programmed phase and amplitude will degrade the radar performance. In many applications, such as radar-based collision detection systems for automotive vehicles, such degradations have to be kept at a minimum in order to assure safe operation and reliability of the systems.

There may thus be a need for simple and reliable ways of monitoring the precision of the phase rotator, in particular with regard to the phase.

SUMMARY

This need may be met by the subject matter according to the independent claims. Advantageous embodiments of the present disclosure are set forth in the dependent claims.

According to a first aspect, there is provided a method of determining phase error caused by impairments in a phase rotator, said impairments including leakage in mixers and/or multipliers of the phase rotator, gain/amplitude imbalance and a known phase imbalance between an I path and a Q path in the phase rotator, the phase rotator having an input for receiving a reference phase value, a local oscillator and circuitry configured to provide an output signal with a phase corresponding to the reference phase value. The method comprises (a) forcing the Q path of the phase rotator to zero and obtaining a first sequence of successive measurement values indicative of a power of the phase rotator output signal, each successive measurement value in the first sequence corresponding to one of a plurality of successive reference phase values, (b) forcing the I path of the phase rotator to zero and obtaining a second sequence of successive measurement values indicative of the power of the phase rotator output signal, each successive measurement value in the second sequence corresponding to one of the plurality of successive reference phase values, (c) forming a sequence of successive measurement value pairs, each measurement value pair comprising one measurement value from the first sequence of successive measurement values and one measurement value from the second sequence of successive measurement values, wherein the first sequence of successive measurement values is shifted relative to the second sequence of successive measurement values by an amount corresponding to the known phase imbalance, (d) calculating an actual phase value for each of the successive measurement value pairs, and (e) determining the phase error by comparing the actual phase values with the corresponding reference phase values.

This aspect is based on the idea that two measurement sequences are performed for a number of successive reference phase values (i.e. input values to the phase rotator), i.e. a first sequence where the Q path of the phase rotator is forced to zero and a second sequence where the I path of the phase rotator is forced to zero. In other words, the first sequence of successive measurement values contains values originating only from the I path of the phase rotator, whereas the second sequence of successive measurement values contains values originating only from the Q path of the phase rotator. Each single measurement value is indicative of the power of the output signal from the phase rotator. Then, the two sequences are shifted relative to each other to form a sequence of successive measurement value pairs. In other words, the i-th measurement value of the first sequence may be paired with the (i+k)-th measurement value of the second sequence. The amount of shifting k is determined such that it corresponds to the known phase imbalance. The known phase imbalance can be determined in various ways known in the art. In the framework of the present disclosure, the phase imbalance can be determined as a phase offset that must be applied to one of the I and Q paths in order to yield the same output power from the phase rotator when the phase reference is set to +45° and −45°, respectively. This determination can be carried out iteratively as follows:

(1) Select a value for parameter Pc.
(2) Apply cos(45°+Pc) to the I path and sin(45°) to the Q path of the phase rotator, and measure the power (P1) at the output of the phase rotator.
(3) Apply cos(−45°+Pc) to the I path and sin(−45°) to the Q path of the phase rotator, and measure the power (P2) at the output of the phase rotator.
(4) Calculate ratio R between the two measured power values, i.e. R=P1/P2.
(5) Repeat (1)-(4) until R=1. The corresponding value of Pc corresponds to the phase imbalance.

Next, actual phase values are calculated for the pairs of measurement values and compared with the corresponding reference phase values to determine the phase error.

Generally, RF design such as in a phase rotator, introduces a phase error. For a phase rotator, this phase error has four main contributors: (i) phase imbalance, i.e. the shift in phase between the I and Q paths; (ii) gain imbalance, i.e. the gain difference between the I and Q paths; (iii) leakage in the I mixer/multiplier, i.e. the leakage introduced by the mixer inputs on the I path; and (iv) leakage on the Q mixer/multiplier, i.e. the leakage introduced by the mixer inputs on the Q path. Each of these four parameters contribute to a degradation of the phase error. However, the maximum of the resulting phase error depends on the actual phase reference (input value to the phase rotator) for each of the four contributors. In other words, the phase reference that gives a max phase error for phase imbalance may be different from the phase reference that gives a max phase error for the gain imbalance. The same apply also to the leakages. Hence, the actual phase error is not the sum of the individual phase error introduced by each of the four contributors. Instead, the phase error is a combination of the individual contributors. The present disclosure enables a determination of this combination.

According to an embodiment, the plurality of successive reference phase values comprises successive reference phase values from 0° to 360° with a predetermined reference phase step value separating any two successive reference phase values. Purely as an example, the phase step value may be equal to 360°/512=0.7°, resulting in successive phase reference values equal to 0°, 0.7°, 1.4°, 2.1° and so on.

According to a further embodiment, the plurality of successive reference phase values is provided as a sweep during a predetermined period of time. In other words, the reference phase value is successively increased from 0° to 360° during the predetermined period of time, e.g. by adding a fixed phase step value to the phase reference value at regular time intervals.

According to a further embodiment, the amount of shifting that corresponds to the known amount of phase imbalance is determined as the number of values in the plurality of successive reference phase values divided by 360 and multiplied by the known amount of phase imbalance. In other words, if the number of values is denoted N and the known phase imbalance is denoted Phi_imb. the amount of shifting is given as (N/360°)*Phi_imb. Hence, if N=512 and Phi_imb=5°, the amount of shifting will be (512/360°) *5°=7.1. Thus, in this exemplary situation, the first and second sequences of successive measurement values will be shifted by 7 (seven) relative to one another when forming the sequence of successive measurement value pairs.

According to a further embodiment, calculating the actual phase value for each of the successive measurement value pairs comprises applying an arctan function to the ratio between the measurement value from the second sequence of successive measurement values and the measurement value from the first sequence of successive measurement values of each successive measurement value pair. In other words, the i-th actual phase value may be calculated as arctan($Q_i/I_{i-k}$) where Q is the i-th measurement value in the second sequence of successive measurement values and $I_{i-k}$ is the (i-k)-th measurement value in the first sequence of successive measurement values.

According to a further embodiment, the method further comprises: comparing the determined phase error with a phase error threshold value, and setting a warning flag if the determined phase error exceeds the phase error threshold value. In other words, as soon as a determined phase error exceeds the phase error threshold value, a warning flag is set such that the system is made aware of the reduced and possibly insufficient precision of the phase rotator.

According to a second aspect, there is provided a device for determining phase error caused by impairments in a phase rotator, said impairments including leakage in mixers and/or multipliers of the phase rotator, a gain/amplitude imbalance and a known phase imbalance between an I path and a Q path in the phase rotator, the phase rotator having an input for receiving a reference phase value, a local oscillator and circuitry configured to provide an output signal with a phase corresponding to the reference phase value. The device comprises (a) a power meter coupled to receive the phase rotator output signal and configured to output a measurement value indicative of a power of the phase rotator output signal, (b) a memory circuit configured to store measurement values output by the power meter, (c) control circuitry configured to provide a plurality of successive reference phase values to the input of the phase rotator, the control circuitry further configured to: (c1) force the Q path of the phase rotator to zero, obtain a first sequence of successive measurement values from the power meter, each successive measurement value in the first sequence corresponding to one of the plurality of successive reference phase values, and store the first sequence of successive measurement values in the memory circuit, and (c2) force the I path of the phase rotator to zero, obtain a second sequence of successive measurement values from the power meter, each successive measurement value in the second sequence corresponding to one of the plurality of successive reference phase values, and store the second sequence of successive measurement values in the memory circuit, the device further comprising (d) processing circuitry configured to: (d1) form a sequence of successive measurement value pairs, each measurement value pair comprising one measurement value from the first sequence of successive measurement values and one measurement value from the second sequence of successive measurement values, wherein the first sequence of successive measurement values is shifted relative to the second sequence of successive measurement values by an amount corresponding to the known phase imbalance, (d2) calculate an actual phase value for each of the successive measurement value pairs, and (d3) determine the phase error by comparing the actual phase values with the corresponding reference phase values.

This aspect is essentially based on the same idea as the first aspect discussed above and provides a device capable of implementing and performing the method according to the first aspect.

According to a further embodiment, the plurality of successive reference phase values comprises successive reference phase values from 0° to 360° with a predetermined reference phase step value separating any two successive reference phase values. Purely as an example, the phase step value may be equal to 360°/512=0.7°, resulting in successive phase reference values equal to 0°, 0.7°, 1.4°, 2.1° and so on.

According to a further embodiment, the control circuitry is configured to provide the plurality of successive reference phase values is provided as a sweep during a predetermined period of time. In other words, the control circuitry successively increases the reference phase value from 0° to 360° during the predetermined period of time, e.g. by adding a fixed phase step value to the phase reference value at regular time intervals.

According to a further embodiment, the processing circuitry is configured to determine the amount of shifting that corresponds to the known amount of phase imbalance as the number of values in the plurality of successive reference phase values divided by 360 and multiplied by the known amount of phase imbalance. In other words, if the number of values is denoted N and the known phase imbalance is denoted Phi_imb, the amount of shifting is given as (N/360°)*Phi_imb. Hence, if N=512 and Phi_imb=5°, the amount of shifting will be (512/360°)*5° 7.1. Thus, in this exemplary situation, the first and second sequences of successive measurement values will be shifted by 7 relative to one another when forming the sequence of successive measurement value pairs.

According to a further embodiment, the processing circuitry is configured to calculate the actual phase value for each of the successive measurement value pairs by applying an arctan function to the ratio between the measurement value from the second sequence of successive measurement values and the measurement value from the first sequence of successive measurement values of each successive measurement value pair. In other words, the processing circuitry may calculate the i-th actual phase value as arctan($Q_i/I_{i-k}$) where Q is the i-th measurement value in the second sequence of successive measurement values and $I_{i-k}$ is the (i-k)-th measurement value in the first sequence of successive measurement values.

According to a further embodiment, the processing circuitry is further configured to compare the determined phase error with a phase error threshold value, and to set a warning flag if the determined phase error exceeds the phase error threshold value. In other words, as soon as a determined phase error exceeds the phase error threshold value, a warning flag is set such that the system is made aware of the reduced and possibly insufficient precision of the phase rotator.

According to a third aspect, there is provided a radar system comprising: (a) a phase rotator having an input for receiving a reference phase value, a local oscillator and circuitry configured to provide an output signal with a phase corresponding to the reference phase value, (b) a power amplifier coupled to receive the output signal from the phase rotator, amplify said output signal and supply the amplified signal to one of a plurality of radar antennas, and (c) a device for determining phase error caused by impairments in the phase rotator, said impairments including leakage in mixers and/or multipliers of the phase rotator, a gain/amplitude imbalance between an I path and a Q path in the phase rotator, the device comprising: (d) a power meter coupled to receive the phase rotator output signal and configured to output a measurement value indicative of a power of the phase rotator output signal, (e) a memory circuit configured to store measurement values output by the power meter, (f) control circuitry configured to provide a plurality of successive reference phase values to the input of the phase rotator, the control circuitry further configured to: (f1) force the Q path of the phase rotator to zero, obtain a first sequence of successive measurement values from the power meter, each successive measurement value in the first sequence corresponding to one of the plurality of successive reference phase values, and store the first sequence of successive measurement values in the memory circuit, and (f2) force the I path of the phase rotator to zero, obtain a second sequence of successive measurement values from the power meter, each successive measurement value in the second sequence corresponding to one of the plurality of successive reference phase values, and store the second sequence of successive measurement values in the memory circuit, the device further comprising (g) processing circuitry configured to: (g1) form a sequence of successive measurement value pairs, each measurement value pair comprising one measurement value from the first sequence of successive measurement values and one measurement value from the second sequence of successive measurement values, wherein the first sequence of successive measurement values is shifted relative to the second sequence of successive measurement values by an amount corresponding to the known phase imbalance, (g2) calculate an actual phase value for each of the successive measurement value pairs, and (g3) determine the phase error by comparing the actual phase values with the corresponding reference phase values.

This aspect is essentially based on the same idea as the first and second aspects described above and provides a radar system comprising a device according to the second aspect.

According to a further embodiment, the plurality of successive reference phase values comprises successive reference phase values from 0° to 360° with a predetermined reference phase step value separating any two successive reference phase values. Purely as an example, the phase step value may be equal to 360°/512=0.7°, resulting in successive phase reference values equal to 0°, 0.7°, 1.4°, 2.1° and so on.

According to a further embodiment, the control circuitry is configured to provide the plurality of successive reference phase values is provided as a sweep during a predetermined period of time. In other words, the control circuitry successively increases the reference phase value from 0° to 360° during the predetermined period of time, e.g. by adding a fixed phase step value to the phase reference value at regular time intervals.

According to a further embodiment, the processing circuitry is configured to determine the amount of shifting that corresponds to the known amount of phase imbalance as the number of values in the plurality of successive reference phase values divided by 360 and multiplied by the known amount of phase imbalance. In other words, if the number of values is denoted N and the known phase imbalance is denoted Phi_imb, the amount of shifting is given as (N/360°)*Phi_imb. Hence, if N=512 and Phi_imb=5°, the amount of shifting will be (512/360°)*5°=7.1. Thus, in this exemplary situation, the first and second sequences of successive measurement values will be shifted by 7 relative to one another when forming the sequence of successive measurement value pairs.

According to a further embodiment, the processing circuitry is configured to calculate the actual phase value for each of the successive measurement value pairs by applying an arctan function to the ratio between the measurement value from the second sequence of successive measurement values and the measurement value from the first sequence of successive measurement values of each successive measurement value pair. In other words, the processing circuitry may calculate the i-th actual phase value as $\arctan(Q_i/I_{i-k})$ where Q is the i-th measurement value in the second sequence of successive measurement values and $I_{i-k}$ is the (i-k)-th measurement value in the first sequence of successive measurement values.

According to a further embodiment, the processing circuitry is further configured to compare the determined phase error with a phase error threshold value, and to set a warning flag if the determined phase error exceeds the phase error threshold value. In other words, as soon as a determined phase error exceeds the phase error threshold value, a warning flag is set such that the system is made aware of the reduced and possibly insufficient precision of the phase rotator.

It should be noted that exemplary embodiments have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present disclosure will be apparent from the examples of embodiment to be described hereinafter and are explained with reference to the examples of embodiment. Aspects of the present disclosure will be described in more detail hereinafter with reference to examples of embodiment to which the present disclosure is, however, not limited.

DETAILED DESCRIPTION

Figure 1:
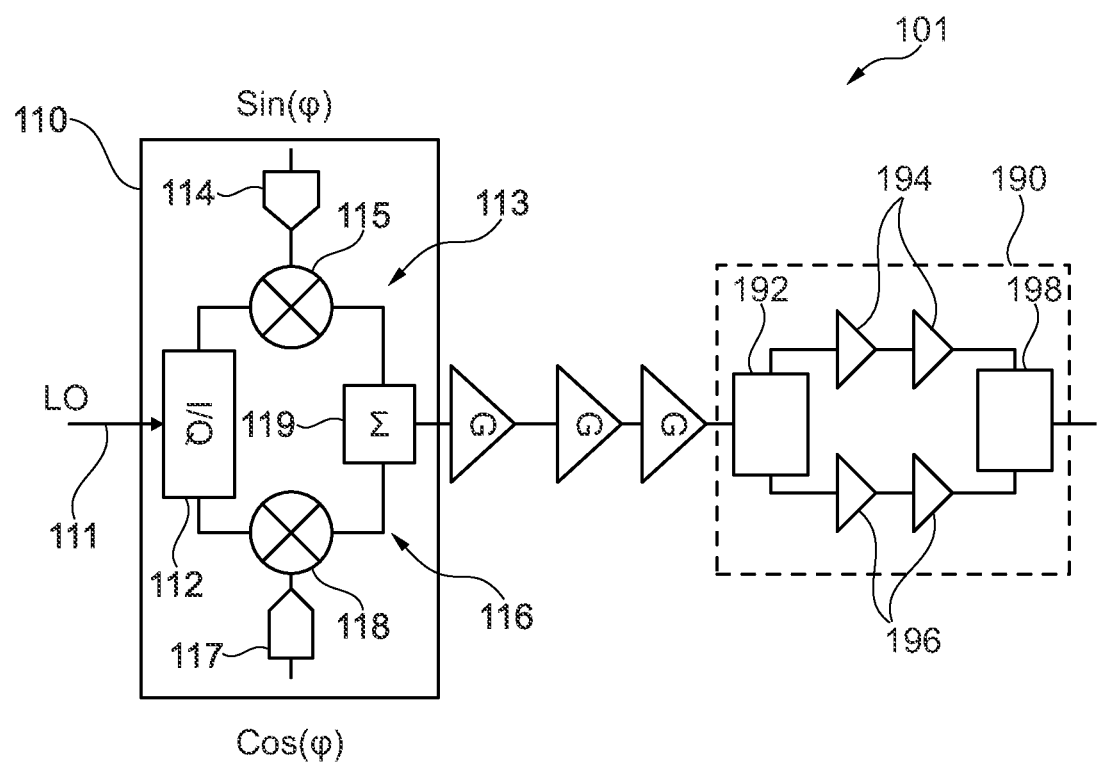
FIG. 1 shows a diagram of a radar system utilizing a phase rotator.

The illustration in the drawing is schematic. It is noted that in different figures, similar or identical elements may be provided with the same reference signs or with reference signs, which differ only within the first digit.

FIG. 1 shows a diagram of a typical radar system 101 utilizing a phase rotator 110 as known in the art, such as an automotive radar for preventing collisions. The phase rotator 110 comprises an input 111, an I/Q splitter 112, an I path (or in-phase path) 113, a Q path (or quadrature path) 116, and an adder 119. The IQ splitter 112 is configured to receive an input signal provided to the input 111 by a local oscillator LO. The I path 113 comprises a multiplier 115 coupled between one output of I/Q splitter 111 and one input of adder 119 and configured to multiply the signal output by I/Q splitter 112 with sin(p) which is received at terminal 114. Here, p denotes a reference phase value indicating the desired phase of the output from the phase rotator 110 relative to the original phase of the signal from LO. Similarly, the Q path 116 comprises a multiplier 118 coupled between the other output of I/Q splitter 111 and the other input of adder 119 and configured to multiply the signal output by I/Q splitter 112 with cos(p) which is received at terminal 117. Again, p is the reference phase value. The output signal from the phase rotator 110 is sent through a series of buffers G and supplied to a power amplifier 190. The shown power amplifier 190 comprises an I/Q splitter 192, a first series of amplifiers 194 coupled to amplify the I component, a second series of amplifiers 196 coupled to amplify the Q component, and a combiner 198 for combining the amplified I and Q components and supply it to a radar antenna array (not shown) as known in the art.

The phase rotator 110 introduces some phase error, i.e. deviation from the desired phase, due to various impairments or imperfections of the phase rotator 110. These phase rotator impairments in particular include (i) gain/amplitude imbalance between the I path 113 and the Q path 116, (ii) phase imbalance between the I path 113 and the Q path 116, and (iii) leakage at multipliers 115 and 118.

Figure 2:
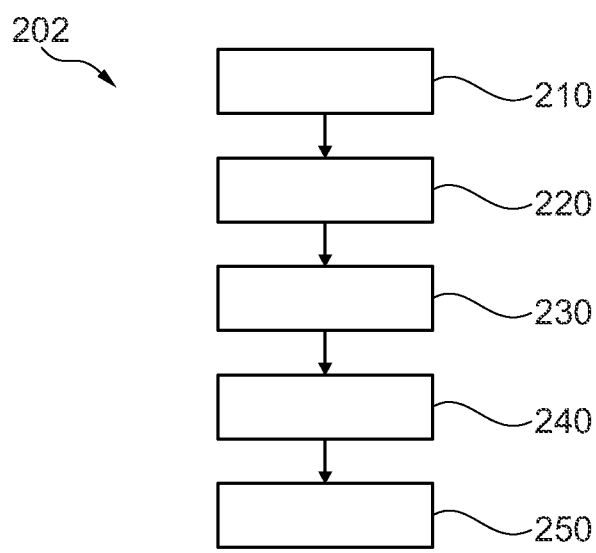
FIG. 2 shows a flowchart of a method of determining phase error according to an exemplary embodiment.

The present disclosure presents a way to measure the phase error due to the phase rotator impairments mentioned above, i.e. leakage in the mixers and/or multipliers, gain imbalance and a known phase imbalance FIG. 2 shows a flowchart of a method 202 of determining phase error according to an exemplary embodiment, the phase error being caused by impairments in a phase rotator, said impairments including leakage in mixers and/or multipliers of the phase rotator, gain/amplitude imbalance and a known phase imbalance between an I path and a Q path in the phase rotator, the phase rotator having an input for receiving a reference phase value, a local oscillator and circuitry configured to provide an output signal with a phase corresponding to the reference phase value. The method 202 comprises the following steps:

At 210, the Q path 116 of the phase rotator 110 is forced to zero (by supplying a constant zero to terminal 117 instead of the regular value cos(p)) and a first sequence of successive measurement values indicative of a power of the phase rotator output signal is obtained. Each successive measurement value in the first sequence corresponds to one of a plurality of successive reference phase values.

At 220, the I path of the phase rotator 110 is forced to zero (by supplying a constant zero to terminal 114 instead of the regular value sin(p)) and a second sequence of successive measurement values indicative of the power of the phase rotator output signal is obtained. Each successive measurement value in the second sequence corresponds to one of the plurality of successive reference phase values.

At 230, a sequence of successive measurement value pairs is formed, each measurement value pair comprising one measurement value from the first sequence of successive measurement values and one measurement value from the second sequence of successive measurement values, wherein the first sequence of successive measurement values is shifted relative to the second sequence of successive measurement values by an amount corresponding to the known phase imbalance.

At 240, an actual phase value for each of the successive measurement value pairs is calculated, and finally, at 250, the phase error is determined by comparing the actual phase values with the corresponding reference phase values.

The plurality of successive reference phase values may comprise successive reference phase values from 0° to 360° with a predetermined reference phase step value separating any two successive reference phase values. For example, the phase step value may be equal to 360°/512=0.7°, resulting in successive phase reference values equal to 0°, 0.7°, 1.4°, 2.1° and so on.

The plurality of successive reference phase values may be provided as a sweep during a predetermined period of time, i.e. the reference phase value may be successively increased from 0° to 360° during the predetermined period of time, e.g. by adding a fixed phase step value to the phase reference value at regular time intervals.

The amount of shifting that corresponds to the known amount of phase imbalance may be determined as the number of values in the plurality of successive reference phase values divided by 360 and multiplied by the known amount of phase imbalance. In other words, if the number of values is denoted N and the known phase imbalance is denoted Phi_imb, the amount of shifting is given as (N/360°)*Phi_imb. Hence, if for example N=512 and Phi_imb=5°, the amount of shifting will be (512/360°)*5°=7.1. Thus, in this example, the first and second sequences of successive measurement values will be shifted by 7 relative to one another when forming the sequence of successive measurement value pairs.

Calculating the actual phase value for each of the successive measurement value pairs may comprise applying an arctan function to the ratio between the measurement value from the second sequence of successive measurement values and the measurement value from the first sequence of successive measurement values of each successive measurement value pair. In other words, the i-th actual phase value may be calculated as $\arctan(Q_i/I_{i-k})$ where Q is the i-th measurement value in the second sequence of successive measurement values and $I_{i-k}$ is the (i-k)-th measurement value in the first sequence of successive measurement values.

The method 202 may further comprise comparing the determined phase error with a phase error threshold value and setting a warning flag if the determined phase error exceeds the phase error threshold value. In other words, as soon as a determined phase error exceeds the phase error threshold value, a warning flag is set such that the system is made aware of the reduced and possibly insufficient precision of the phase rotator.

Figure 3:
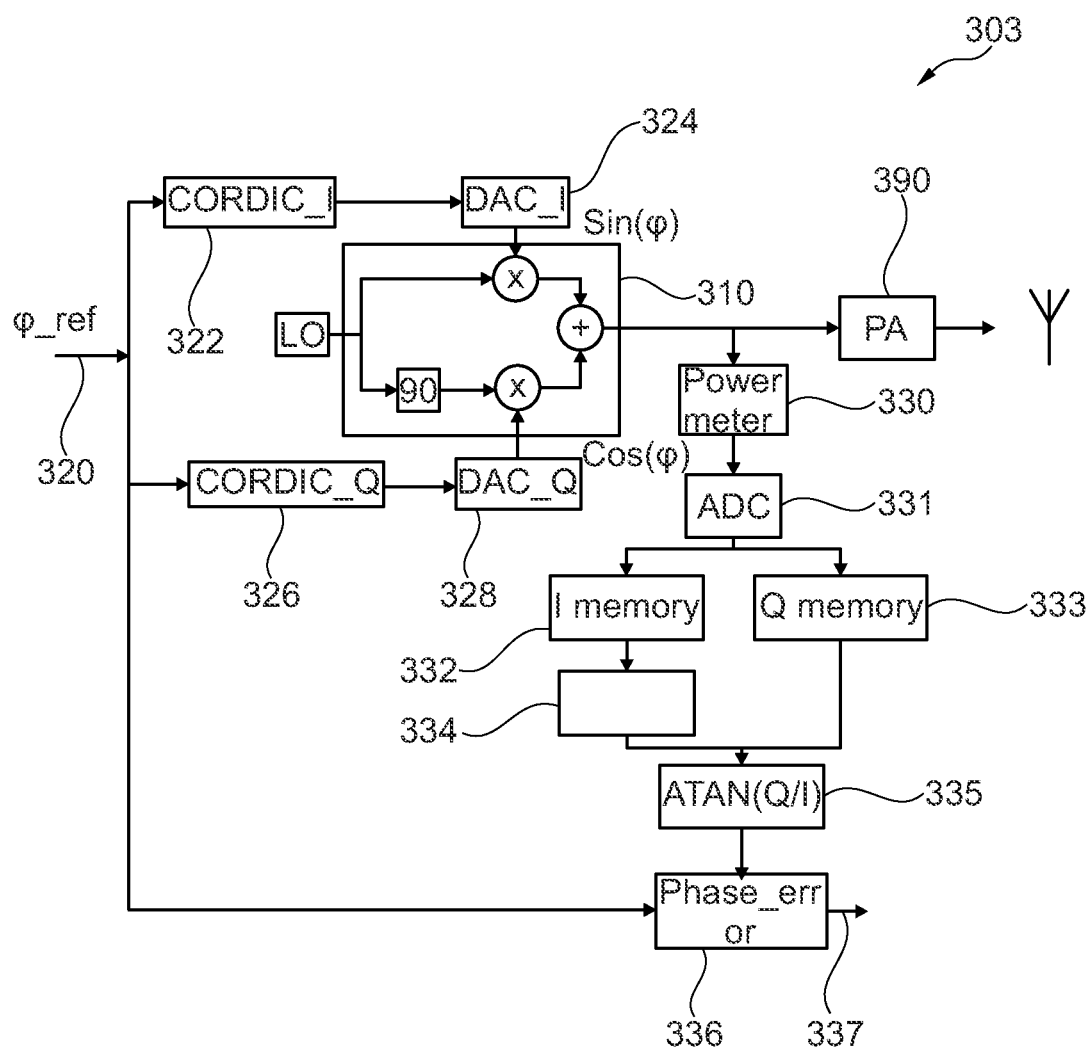
FIG. 3 shows a diagram of a device for determining phase error according to an exemplary embodiment.

FIG. 3 shows a diagram of a device for determining phase error according to an exemplary embodiment within a radar system 303. The radar system 303, like the radar system 101 shown in FIG. 1 and discussed above, comprises a phase rotator 310 and a power amplifier 390 for supplying a signal with a predetermined phase to a radar antenna. The phase rotator 310 is coupled to circuitry for supplying the sin(p) and cos(p) factors to be multiplied onto the I and Q paths within the phase rotator 310. More specifically, said circuitry comprises a CORDIC circuit 322 and a DAC 324 for supplying sin(p) corresponding to phase reference value φ_ref received at input terminal 320. Furthermore, said circuitry comprises a CORDIC circuit 326 and a DAC 328 for supplying cos(p) corresponding to the phase reference value φ_ref.

The actual device for determining phase error comprises circuitry blocks 330, 331, 332, 333, 334, 335, 336, and 337. More specifically, the device comprises a power meter 330 coupled to receive the phase rotator output signal and configured to output a measurement value indicative of a power of the phase rotator output signal to ADC 331. The device further comprises a memory circuit including I memory 332 and Q memory configured to store corresponding measurement values output from the power meter 330 through the ADC 331. The device further comprises a shifting or delay unit 334 configured shift the measurement values stored in the I memory 334 relative to the measurement values stored in the Q memory 333 in order to form pairs of successive measurement values that are supplied to actual phase calculation circuit 335 which applies an arctan function to the pair of measurement values to calculate the actual phase of the output from the phase rotator 310, that is φ_meas=arctan(Q/I). The calculated actual phase value is supplied to circuit 336 which also receives the reference phase value φ_ref and thereby calculates the sought phase error by comparing (e.g. subtracting) the two received phase values. The device also comprises a controller (not shown) configured to override the circuits 322 and 326 during measurement in accordance with the method 202 discussed above and to set an error flag if the determined phase error exceeds a threshold value.

Figure 4:
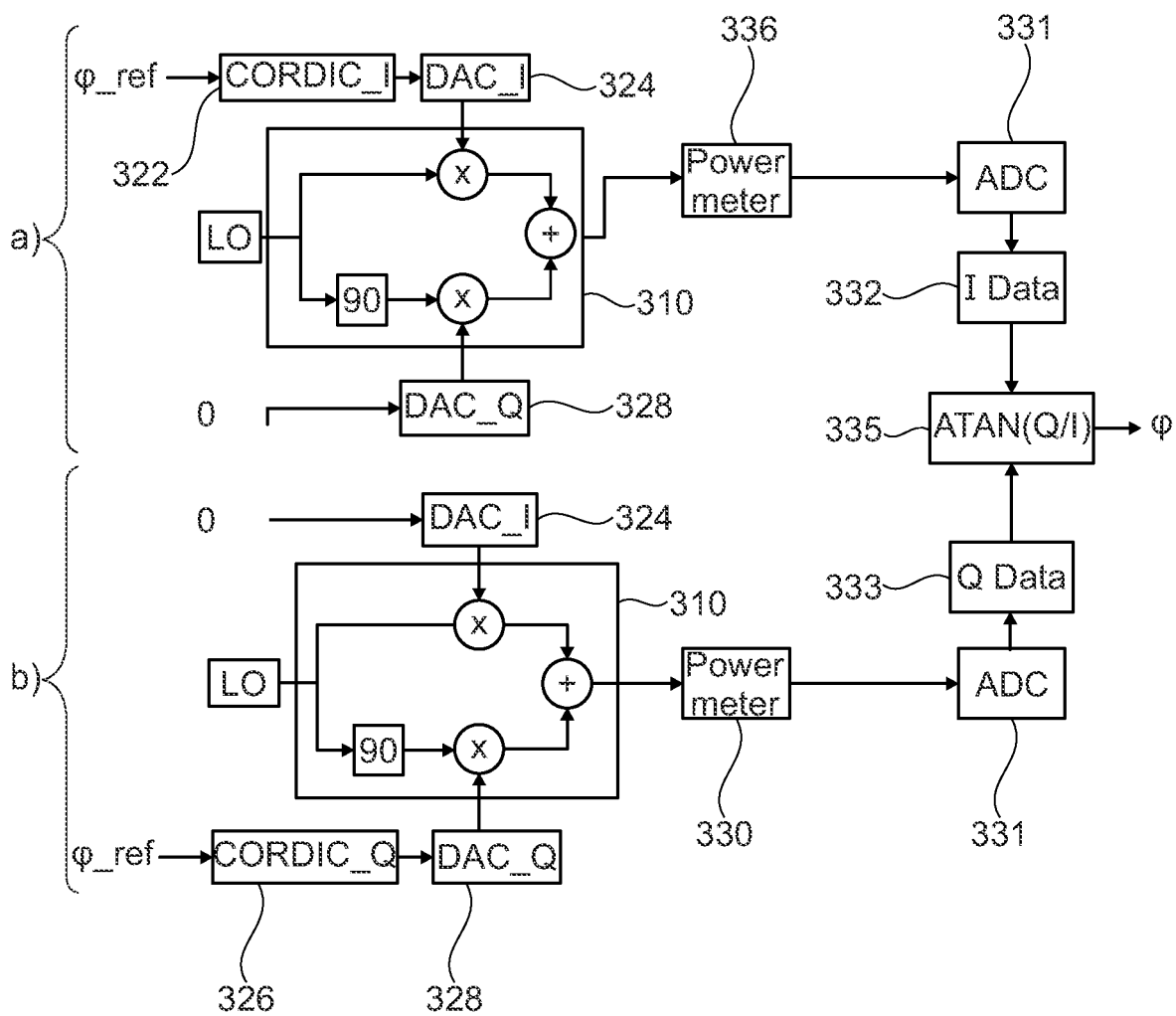
FIG. 4 illustrates the function of the device shown in FIG. 3.

FIG. 4 illustrates the function of the device shown in FIG. 3 when operated in accordance with the method 202 shown in FIG. 2. More specifically, FIG. 4 shows the device in a first state a) corresponding to step 210 in FIG. 2 and a second state b) corresponding to step 220 in FIG. 2. In state a), the Q path of the phase rotator 310 is set to zero while a sequence of successive reference phase values φ_ref is supplied to the I path of phase rotator 310 through CORDIC circuit 322 and a DAC 324. A first sequence of successive measurement values is obtained by the power meter 330 and ADC 332 and stored in memory circuit 332. Then, in state b), the I path of the phase rotator 310 is set to zero while the same sequence of successive reference phase values φ_ref is supplied to the Q path of phase rotator 310 through CORDIC circuit 326 and a DAC 328. A second sequence of successive measurement values is obtained by the power meter 330 and ADC 332 and stored in memory circuit 333. The data stored in memory circuits 332 and 333 is processed as previously described to determine the resulting phase error.

Figure 5:
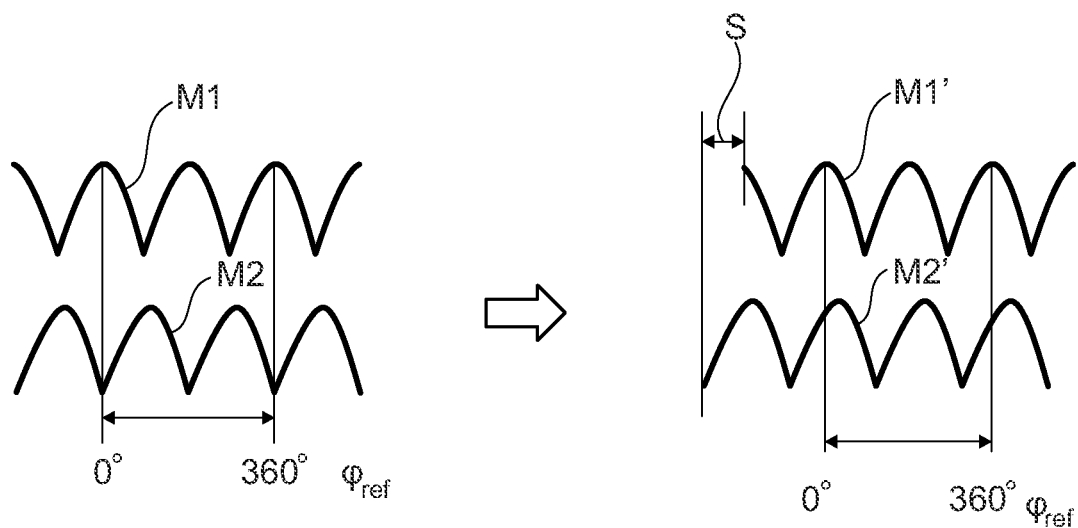
FIG. 5 illustrates shifting of measurement values in accordance with an exemplary embodiment.

FIG. 5 illustrates shifting of measurement values in accordance with an exemplary embodiment. More specifically, the left-hand diagram in FIG. 5 shows the first sequence of successive measurement values M1 and the second sequence of successive measurement value M2 as a function of the reference phase value φ_ref. As indicated by the two vertical lines at φ_ref=0° and φ_ref=360°, the first sequence M1 has maximum values where the second sequence M2 has minimum values and vice versa. In the right-hand diagram of FIG. 5, the result of shifting (delaying) the first sequence of successive measurement values M1 by an amount S corresponding to the known phase imbalance of the phase rotator 310 is shown. As can be seen, the maximum values in the shifted sequence M1' no longer corresponds to the minimum values in the second sequence M2.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be combined. It should also be noted that reference signs in the claims should not be construed as limiting the scope of the claims.

The invention claimed is:

1. A method of determining phase error caused by impairments in a phase rotator, said impairments including leakage in mixers and/or multipliers of the phase rotator, gain/amplitude imbalance and a known phase imbalance between an I path and a Q path in the phase rotator, the phase rotator having an input for receiving a reference phase value, a local oscillator (LO) and circuitry configured to provide an output signal with a phase corresponding to the reference phase value, the method comprising:

forcing the Q path of the phase rotator to zero and obtaining a first sequence of successive measurement values indicative of a power of the phase rotator output signal, each successive measurement value in the first sequence corresponding to one of a plurality of successive reference phase values, forcing the I path of the phase rotator to zero and obtaining a second sequence of successive measurement values indicative of the power of the phase rotator output signal, each successive measurement value in the second sequence corresponding to one of the plurality of successive reference phase values, forming a sequence of successive measurement value pairs, each measurement value pair comprising one measurement value from the first sequence of successive measurement values and one measurement value from the second sequence of successive measurement values after the first sequence of successive measurement values is shifted relative to the second sequence of successive measurement values by an amount corresponding to the known phase imbalance and a number of values in the plurality of successive reference phase values, calculating a respective actual phase value for each of the successive measurement value pairs, each actual phase value being based on measurement values of a corresponding successive measurement value pair, and determining the phase error by comparing the actual phase values with the corresponding reference phase values;

wherein the amount of shifting that corresponds to the known amount of phase imbalance is determined as the number of values in the plurality of successive reference phase values divided by 360 and multiplied by the known amount of phase imbalance.

2. The method according to claim 1, wherein the plurality of successive reference phase values comprises successive reference phase values from 0° to 360° with a predetermined reference phase step value separating any two successive reference phase values.

3. The method according to claim 1, wherein the plurality of successive reference phase values is provided as a sweep during a predetermined period of time.

4. The method according to claim 1, wherein calculating the respective actual phase value for each of the successive measurement value pairs comprises applying an arctan function to the ratio between the measurement value from the second sequence of successive measurement values and the measurement value from the first sequence of successive measurement values of each successive measurement value pair.

5. The method according to claim 1, further comprising:
comparing the determined phase error with a phase error threshold value, and
setting a warning flag if the determined phase error exceeds the phase error threshold value.

6. A device for determining phase error caused by impairments in a phase rotator, said impairments including leakage in mixers and/or multipliers of the phase rotator, gain/amplitude imbalance and a known phase imbalance between an I path and a Q path in the phase rotator, the phase rotator having an input for receiving a reference phase value, a local oscillator (LO) and circuitry configured to provide an output signal with a phase corresponding to the reference phase value, the device comprising:
a power meter coupled to receive the phase rotator output signal and configured to output a measurement value indicative of a power of the phase rotator output signal,
a memory circuit configured to store measurement values output by the power meter,
control circuitry configured to provide a plurality of successive reference phase values to the input of the phase rotator, the control circuitry further configured to:
force the Q path of the phase rotator to zero, obtain a first sequence of successive measurement values from the power meter, each successive measurement value in the first sequence corresponding to one of the plurality of successive reference phase values, and store the first sequence of successive measurement values in the memory circuit, and
force the I path of the phase rotator to zero, obtain a second sequence of successive measurement values from the power meter, each successive measurement value in the second sequence corresponding to one of the plurality of successive reference phase values, and store the second sequence of successive measurement values in the memory circuit,
the device further comprising processing circuitry configured to:
form a sequence of successive measurement value pairs, each measurement value pair comprising one measurement value from the first sequence of successive measurement values and one measurement value from the second sequence of successive measurement values after the first sequence of successive measurement values is shifted relative to the second sequence of successive measurement values by an amount corresponding to the known phase imbalance and a number of values in the plurality of successive reference phase values,
calculate a respective actual phase value for each of the successive measurement value pairs, each actual phase value being based on measurement values of a corresponding successive measurement value pair, and
determine the phase error by comparing the actual phase values with the corresponding reference phase values;
wherein the processing circuitry is configured to determine the amount of shifting that corresponds to the known amount of phase imbalance as the number of values in the plurality of successive reference phase values divided by 360 and multiplied by the known amount of phase imbalance.

7. The device according to claim 6, wherein the plurality of successive reference phase values comprises successive reference phase values from 0° to 360° with a predetermined reference phase step value separating any two successive reference phase values.

8. The device according to claim 6, wherein the control circuitry is configured to provide the plurality of successive reference phase values as a sweep during a predetermined period of time.

9. The device according to claim 6, wherein the processing circuitry is configured to calculate the respective actual phase value for each of the successive measurement value pairs by applying an arctan function to the ratio between the measurement value from the second sequence of successive measurement values and the measurement value from the first sequence of successive measurement values of each successive measurement value pair.

10. The device according to claim 6, wherein the processing circuitry is further configured to:
compare the determined phase error with a phase error threshold value, and
set a warning flag if the determined phase error exceeds the phase error threshold value.

11. A radar system comprising:
a phase rotator having an input for receiving a reference phase value, a local oscillator (LO) and circuitry configured to provide an output signal with a phase corresponding to the reference phase value,
a power amplifier coupled to receive the output signal from the phase rotator, amplify said output signal and supply the amplified signal to one of a plurality of radar antennas, and
a device for determining phase error caused by impairments in the phase rotator, said impairments including leakage in mixers and/or multipliers of the phase rotator, gain/amplitude imbalance and a known phase imbalance between an I path and a Q path in the phase rotator, the device comprising:
a power meter coupled to receive the phase rotator output signal and configured to output a measurement value indicative of a power of the phase rotator output signal,
a memory circuit configured to store measurement values output by the power meter, control circuitry configured to provide a plurality of successive reference phase values to the input of the phase rotator, the control circuitry further configured to:
force the Q path of the phase rotator to zero, obtain a first sequence of successive measurement values from the power meter, each successive measurement value in the first sequence corresponding to one of the plurality of successive reference phase values, and store the first sequence of successive measurement values in the memory circuit, and
force the I path of the phase rotator to zero, obtain a second sequence of successive measurement values from the power meter, each successive measurement value in the second sequence corresponding to one of the plurality of successive reference phase values, and store the second sequence of successive measurement values in the memory circuit, the device further comprising processing circuitry configured to:
form a sequence of successive measurement value pairs, each measurement value pair comprising one measurement value from the first sequence of successive measurement values and one measurement value from the second sequence of successive measurement values after the first sequence of successive measurement values is shifted relative to the second sequence of successive measurement values by an amount corresponding to the known phase imbalance and a number of values in the plurality of successive reference phase values,
calculate a respective actual phase value for each of the successive measurement value pairs, each actual phase value being based on measurement values of a corresponding successive measurement value pair, and
determine the phase error by comparing the actual phase values with the corresponding reference phase values;

wherein the processing circuitry is configured to determine the amount of shifting that corresponds to the known amount of phase imbalance as the number of values in the plurality of successive reference phase values divided by 360 and multiplied by the known amount of phase imbalance.

12. The radar system according to claim 11, wherein the plurality of successive reference phase values comprises successive reference phase values from 0° to 360° with a predetermined reference phase step value separating any two successive reference phase values.

13. The radar system according to claim 11, wherein the control circuitry is configured to provide the plurality of successive reference phase values as a sweep during a predetermined period of time.

14. The radar system according to claim 13, wherein the control circuitry is configured to provide the plurality of successive reference phase values by adding a fixed phase step value to the reference phase value at regular time intervals.

15. The radar system according to claim 11, wherein the processing circuitry is configured to calculate the respective actual phase value for each of the successive measurement value pairs by applying an arctan function to the ratio between the measurement value from the second sequence of successive measurement values and the measurement value from the first sequence of successive measurement values of each successive measurement value pair.

16. The radar system according to claim 11, wherein the processing circuitry is further configured to:
compare the determined phase error with a phase error threshold value, and set a warning flag if the determined phase error exceeds the phase error threshold value.

17. The radar system according to claim 16, wherein the warning flag provides an indication of reduced or insufficient precision of the phase rotator.

* * * * *